US 8,661,167 B2

(12) United States Patent
Hsin et al.

(10) Patent No.: US 8,661,167 B2
(45) Date of Patent: Feb. 25, 2014

(54) DMA (DIRECT MEMORY ACCESS) COALESCING

(75) Inventors: Chih-Fan Hsin, Portland, OR (US);
Jr-Shian Tsai, Beaverton, OR (US);
Tsung-Yuan C. Tai, Portland, OR (US)

(73) Assignee: Intel Corporation, Santa Clara, CA (US)

(*) Notice: Subject to any disclaimer, the term of this patent is extended or adjusted under 35 U.S.C. 154(b) by 516 days.

(21) Appl. No.: 12/655,311

(22) Filed: Dec. 29, 2009

(65) Prior Publication Data

US 2010/0153590 A1 Jun. 17, 2010
US 2012/0137029 A9 May 31, 2012

Related U.S. Application Data

(63) Continuation-in-part of application No. 12/208,654, filed on Sep. 11, 2008, now Pat. No. 8,112,646.

(60) Provisional application No. 60/973,044, filed on Sep. 17, 2007, provisional application No. 60/973,038, filed on Sep. 17, 2007, provisional application No. 60/973,035, filed on Sep. 17, 2007, provisional application No. 60/973,031, filed on Sep. 17, 2007.

(51) Int. Cl.
*G06F 3/00* (2006.01)
*G06F 13/00* (2006.01)

(52) U.S. Cl.
USPC .......... 710/25; 710/5; 710/8; 710/15; 710/22; 710/33

(58) Field of Classification Search
None
See application file for complete search history.

(56) References Cited

U.S. PATENT DOCUMENTS

| | | | |
|---|---|---|---|
| 5,210,829 A | 5/1993 | Bitner | |
| 6,311,081 B1 | 10/2001 | Northcutt et al. | |
| 6,865,653 B2 | 3/2005 | Zaccarin et al. | |
| 2003/0067872 A1 | 4/2003 | Harrell et al. | |
| 2003/0131273 A1 | 7/2003 | Watts, Jr. et al. | |
| 2003/0137945 A1 | 7/2003 | Yavatkar et al. | |
| 2004/0073692 A1 | 4/2004 | Gentle et al. | |
| 2004/0264396 A1 | 12/2004 | Ginzburg et al. | |
| 2005/0073952 A1 | 4/2005 | Champlin et al. | |
| 2005/0180443 A1 | 8/2005 | Schulz et al. | |

(Continued)

FOREIGN PATENT DOCUMENTS

GB 2352371 A 1/2001
JP 04-067248 A 3/1992

(Continued)

OTHER PUBLICATIONS

DMA Fundamentals on Various PC Platforms, Apr. 1991, Texas Instruments, [Online, accessed on Jul. 29, 2011], URL: http://physweb.bgu.ac.il/COURSES/SignalNoise/DMA.pdf.*

(Continued)

*Primary Examiner* — Scott Sun

(57) ABSTRACT

In general, in one aspect, a method includes determining a repeated, periodic DMA (Direct Memory Access) coalescing interval based, at least in part, on a power sleep state of a host platform. The method also includes buffering data received at the device in a FIFO (First-In-First-Out) queue during the interval and DMA-ing the data enqueued in the FIFO to a memory external to the device after expiration of the repeated, periodic DMA coalescing interval.

17 Claims, 9 Drawing Sheets

(56) References Cited

U.S. PATENT DOCUMENTS

| | | | |
|---|---|---|---|
| 2006/0104303 A1* | 5/2006 | Makineni et al. | 370/463 |
| 2006/0227815 A1 | 10/2006 | Khan | |
| 2007/0242676 A1 | 10/2007 | Fridman | |
| 2008/0005405 A1 | 1/2008 | Innis et al. | |
| 2008/0140878 A1* | 6/2008 | Bar-Shalom et al. | 710/26 |
| 2009/0077394 A1 | 3/2009 | Tsai et al. | |
| 2009/0077395 A1 | 3/2009 | Tsai | |
| 2009/0077396 A1 | 3/2009 | Tsai et al. | |
| 2009/0077401 A1 | 3/2009 | Tsai | |

FOREIGN PATENT DOCUMENTS

| | | |
|---|---|---|
| JP | 2000-106605 A | 4/2000 |
| JP | 2000-316035 A | 11/2000 |
| JP | 2000-357987 A | 12/2000 |
| JP | 2003-158481 A | 5/2003 |
| JP | 2004-104192 A | 4/2004 |
| JP | 2005-507190 A | 3/2005 |
| JP | 2005-328439 A | 11/2005 |
| JP | 2006277332 A | 10/2006 |
| TW | I267732 B | 12/2006 |
| WO | 2009/039034 A1 | 3/2009 |

OTHER PUBLICATIONS

International Search Report and Written Opinion issued in PCT Patent Application No. PCT/US2008/076135, Feb. 27, 2009, 11 Pages.

International Preliminary Report on Patentability for PCT Patent Application No. PCT/US2008/076135, mailed on Apr. 1, 2010, 6 pages.

Office Action received for Korean Patent Application No. 10-2010-7005914, mailed on May 31, 2011, 2 pages of English Translation.

Office Action English Language Translation Summary from corresponding application filed in Japan; application No. 2010-524263, filed Sep. 12, 2008; mailed Aug. 16, 2011; 5 pages.

Office Action Received for Taiwanese Patent Application No. 097135495, mailed on Jun. 15, 2012, 7 Pages of Taiwanese Office Action and 7 Pages of English Translation.

Office Action Received for Chinese Patent Application No. 200880107063.X, mailed on Sep. 21, 2011, 9 Pages of Chinese Office Action and 5 Pages of English Translation.

Office Action Received for Japanese Patent Application No. 2010-524263, mailed on Aug. 16, 2011, 2 Pages of Japanese Office Action and 3 Pages of English Translation.

Office Action Received for Japanese Patent Application No. 2010-524263, mailed on Feb. 28, 2012, 2 Pages of Japanese Office Action and 2 Pages of English Translation.

Office Action Received for U.S. Appl. No. 12/208,654, mailed on May 27, 2011, 27 pages.

Notice of Allowance Received for U.S. Appl. No. 12/208,654, mailed on Sep. 27, 2011, 5 pages.

Tsai, Jr-Shan, U.S. Appl. No. 12/208,654, Titled "Buffering Techniques for Power Management", filed Sep. 11, 2008, 49 pages.

* cited by examiner

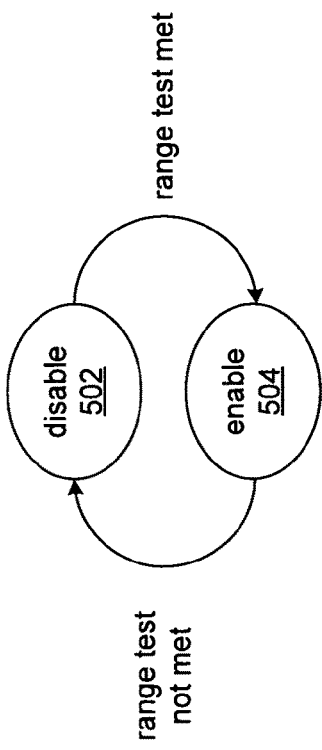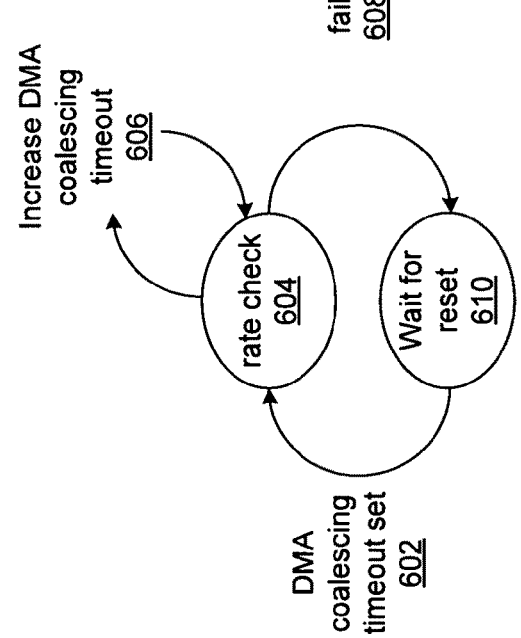
FIG. 5
FIG. 6

DMA (DIRECT MEMORY ACCESS) COALESCING

CROSS-REFERENCE TO RELATED APPLICATIONS

This application is a continuation-in-part of prior U.S. patent application Ser. No. 12/208,654, filed Sep. 11, 2008, now U.S. Pat. No. 8,112,646 entitled "Buffering Techniques for Power Management," which claims the benefit of U.S. Provisional Application No. 60/973,031, filed Sep. 17, 2007, U.S. Provisional Application No. 60/973,035, filed Sep. 17, 2007, U.S. Provisional Application No. 60/973,038, filed Sep. 17, 2007, and U.S. Provisional Application No. 60/973,044, filed Sep. 17, 2007.

BACKGROUND

Networks enable computers and other devices to communicate. For example, networks can carry data representing video, audio, e-mail, and so forth. Typically, data sent across a network is divided into smaller messages known as packets. By analogy, a packet is much like an envelope you drop in a mailbox. A packet typically includes "payload" and a "header". The packet's "payload" is analogous to the letter inside the envelope. The packet's "header" is much like the information written on the envelope itself. The header can include information to help network devices handle the packet appropriately. For example, the header can include an address that identifies the packet's destination.

Systems receiving packets typically include devices known as Network Interface Controllers (NICs) (a.k.a. Network Adaptors). Traditionally, upon receipt of a packet, a NIC will perform a Direct Memory Access (DMA) of packet data to host memory. This Direct Memory Access frees the host processor from the duty of overseeing transfer of data between memory and the NIC. Once in host memory, the NIC can generate an interrupt to alert a host processor to the arrival of the packet. In response, a protocol stack executed by the host processor typically processes the packet in accordance with different layers of network communication protocols.

BRIEF DESCRIPTION OF THE DRAWINGS

FIG. 5 is a diagram illustrating enablement and disablement of DMA coalescing.

FIG. 6 is a diagram illustrating adaptive determination of a DMA coalescing timer.

DETAILED DESCRIPTION

Figure 1:
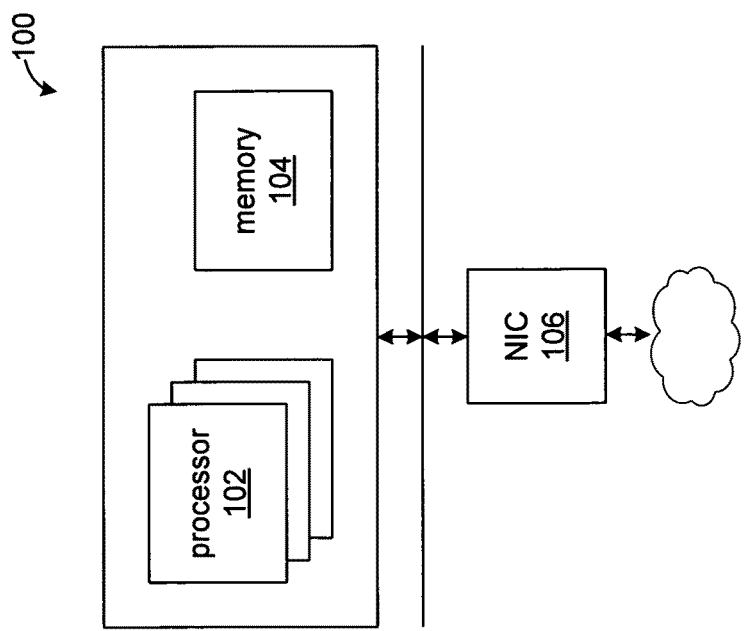
FIG. 1 is a diagram of a system including a network interface controller (NIC).

FIG. 1 depicts a host system 100 featuring processor(s) 102 and host memory 104. Host system 100 processor 102 may execute applications that communicate over a network via a coupled network interface controller (NIC) 106. The NIC 106 handles receipt and transmission of packets over a network connection (e.g., a wired or wireless physical medium). The NIC 106 may be a discrete component (e.g., a card) or integrated on a motherboard and/or processor die.

To process received packets, NIC 106 transfers packets to host memory 104 for subsequent processing by the host (e.g., by a network protocol stack and/or application software). To reduce the burden of network communication on processor(s) 102, NIC 106 features a Direct Memory Access (DMA) engine that moves packet data from the NIC 106 to host memory 104. While DMA reduces the burden of packet processing on a processor 102, the frequency and unpredictability of DMA activity can prevent the long periods of inactivity needed for the host system 100 to enter low power states.

As an example, host 100 may feature the ability to enter power saving states, often referred to as sleep modes (e.g., Cn in ACPI (Advanced Configuration and Power Interface) where increasing values of n correspond to deeper power saving modes). Such sleep states can reduce power consumed by varying platform components by varying degrees. A longer sleep duration can permit a system to enter a deeper power saving mode. However, repeated DMA operations can prevent the host 100 from extended idle periods, preventing deeper power saving states. For example, network traffic tends to have short gaps between packets, even for lightly loaded traffic, creating short, choppy periods of inactivity whose modest duration prevents the host 100 from having a long enough idle duration to enter lower power states.

Figure 2:
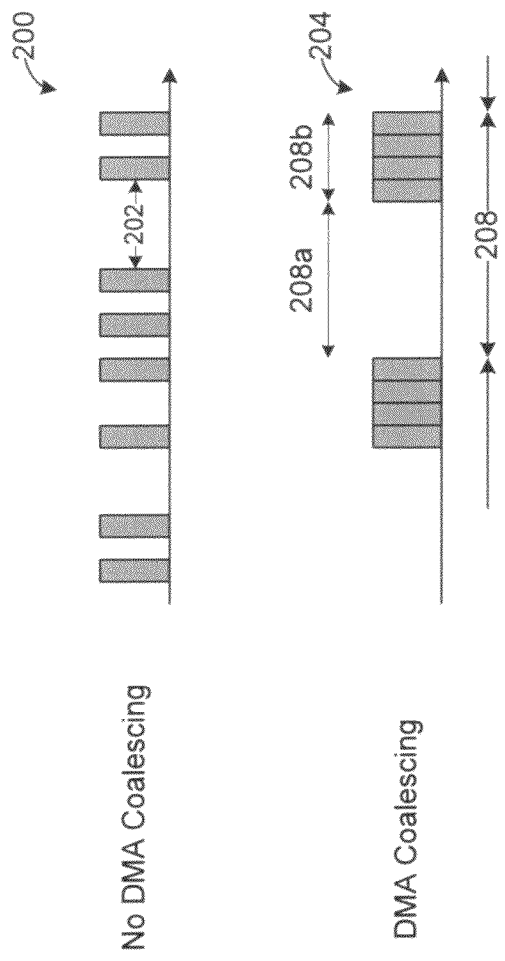
FIG. 2 is a diagram illustrating Direct Memory Access (DMA) coalescing.

As shown in FIG. 2, the system can coalesce DMA operations to increase periods of time without NIC initiated DMA activity. For example, instead of initiating a DMA transfer after receipt of each packet, a NIC 106 can buffer received packets and initiate DMA transfer of multiple queued packets in succession. This concentrates NIC initiated DMA operations into a smaller period of time which can, in turn, increase the possibility of host 100 entering a deeper power saving mode.

To illustrate, FIG. 2 depicts traditional DMA transfer 200 of packets as they arrive. This distribution of DMA operations over time creates, by happenstance, a short, difficult to predict, periods of time (e.g., 202) where DMA activity temporarily ceases. By comparison, FIG. 2 also depicts a sample illustration of DMA coalescing 204 where NIC 106 buffers received packets during a DMA coalescing duration 208a. After this duration 208a, the NIC 106 initiates 208b DMA transfer of the buffered packets. As shown, this can reliably generate larger, more regular periods 208a without DMA activity initiated by the NIC 106. As shown, DMA coalescing 204 can let the platform enter a deeper idle state (e.g., ACPI C6 state) and stay there longer, increasing power savings. As shown in FIG. 2, the scheme can create a repeating cycle having a first phase where DMA coalescing queues received packets 208a and a second phase where DMA coalescing is stopped and the packets are DMA-ed 208b to the host.

Figure 3:
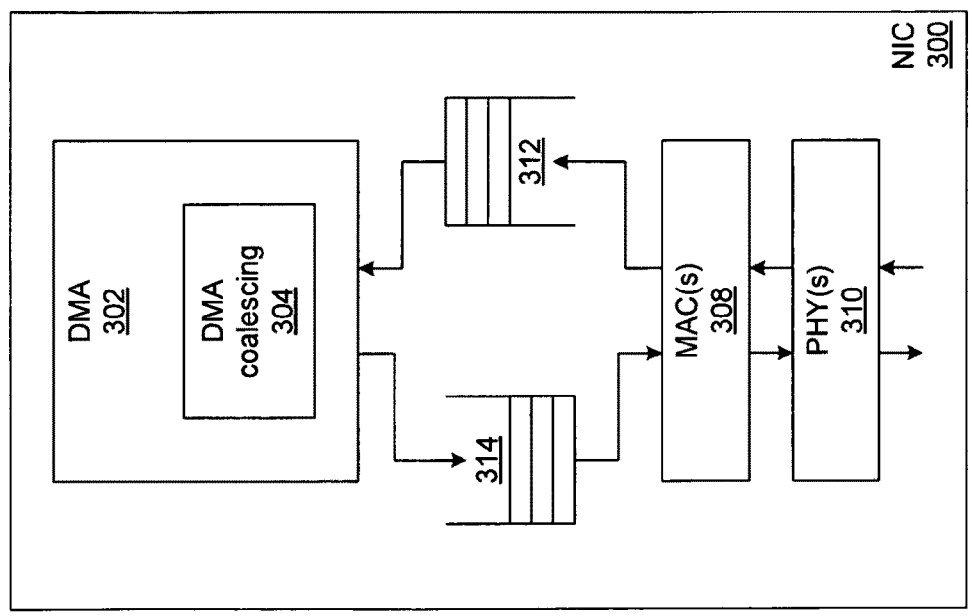
FIG. 3 is a diagram of a network interface controller implementation of DMA coalescing.

FIG. 3 depicts a sample architecture of a NIC 300 implementing DMA coalescing in greater detail. As shown, the NIC 300 features PHY(s) 310 and MAC(s) 308 (media access controllers) which handle physical layer and link layer operations, respectively. The NIC 300 also includes DMA engine(s) 302. Received (Rx) packets are queued in ingress Rx FIFO 312. Likewise, packets to transmit (Tx) are enqueued in egress Tx FIFO 314. Again, instead of initiating a DMA for received (Rx) packets as soon as the packet reaches the top of Rx FIFO 312, Rx packets can be buffered in Rx FIFO 312 during a DMA coalescing period. After the coalescing period elapses, DMA engine(s) 302 can dequeue the buffered packets from RxFIFO 312 and initiate DMA transfers.

Typically, a NIC 300 performs DMA transfers through the use of descriptors that identify candidate buffers in host memory 104 to store packets. A descriptor may identify, for example, a location within a buffer within host memory 104 and a length of buffer available to store a packet. Generally, a host 100 transfers descriptors for available buffers to NIC 300 by a host DMA engine (not shown). The NIC 300 then uses these descriptors to instruct the DMA engine 302 where to transfer packet data in host memory 104. The NIC 300 also generates a return descriptor which identifies the location of the packet and may identify features of the packet such as packet length, hash values, packet types, checksum pass/fail and so forth. The host 100, in turn, uses the return descriptor to determine the location of a packet in host memory. Thus, in addition to the DMA of a packet to host memory, DMA of descriptors and return descriptors between the host and NIC may also be confined to the period of DMA operation.

Figure 4:
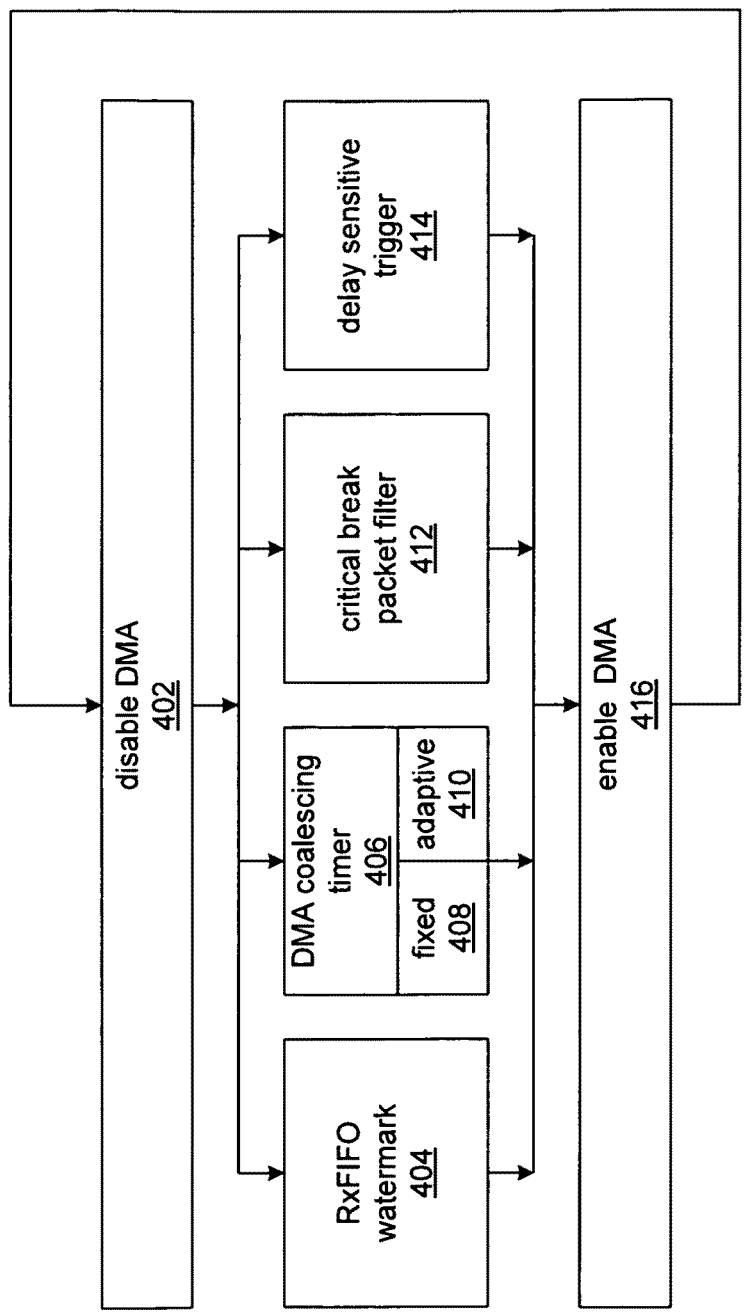
FIG. 4 is a diagram illustrating DMA coalescing logic.

As shown in FIG. 3, DMA coalescing is controlled by DMA coalescing logic 304 of NIC 300. FIG. 4 illustrates a sample implementation of DMA coalescing logic. The sample implementation repeatedly disables 402 and enables 416 NIC DMA operations. In typical operation, a DMA coalescing timer 406 controls DMA operations. That is, packets are enqueued until expiration of the timer. This ensures packets do not remain queued indefinitely.

Potentially, a DMA coalescing period may be terminated before expiration of the timer. For example, to ensure Rx FIFO 312 has sufficient space to buffer received packets while the host platform transitions from a lower power idle state to an active state, RxFIFO watermark 404 logic may cause a DMA flush of queued data before expiration of a DMA coalescing timer period. For instance, to make sure packets will not be dropped due to the lack of available Rx FIFO 312 space, space watermark logic 404 may initiate a DMA flush of queue packets if the remaining Rx FIFO space falls below $(T_{exit}*W)$ where $T_{exit}$ is the exit latency duration of the low power idle state and W is the link speed carrying the data being queued. After the flushing, DMA coalescing is restarted.

The timer 404 value can be set statically or dynamically. A fixed timer 408 value may be set by a user or automatically determined by a NIC, device driver, or other entity. Generally, greater DMA coalescing periods can result in larger idle periods. However, extended coalescing periods can increase packet processing latency as packets await DMA transfer. Thus, selecting a fixed timer 408 value may reflect different packet processing objectives.

For example, the timer 404 value can be set to attempt to keep the platform at the lowest power idle state long enough to gain the most power benefit. Lower power states typically have longer entry and exit latencies (e.g., longer transition durations to power components up or down). Additionally, different power state transitions may also consume different amounts of power. Based on these factors, there exists a break-even idle time for each idle state where the benefit to entering the state is greater than the power consumed by state transitions. In other words, to gain power benefit for entering the lowest power idle state, the platform needs to stay idle for longer than a break-even time, denoted by $T_{be}$. $T_{be}$ is platform-specific and varies for each power state. In a typical Operating System (OS) policy, a platform can enter the lowest power idle state only when the CPU utilization is less than or equal to certain threshold, denoted by $F_{util}$%. For example, in the current Windows Vista™ policy, $F_{util}$%=40%. In such environments, the coalescing timer may need to generate at least $T_{be}$ idle time at $F_{util}$% CPU utilization level to reduce overall power consumption. A minimum coalescing time period can be calculated as:

$$Tc\_min=T_{be}/(1-F_{util}\%)$$

Thus, when CPU utilization<$F_{util}$%, Tc_min will generate idle time longer than $T_{be}$.

Again, when the CPU utilization>$F_{util}$%, due to OS policy, a platform may not enter the lowest power idle state.

Using a longer coalescing timeout than Tc_min can potentially provide better power savings, however, this may come at the expense of increased latency for received packets. Thus, a metric may be used to limit the coalescing timeout value. For example, a minimum throughput constraint may be used. For instance, assume each user connecting to a server generally achieves Internet throughput at $W_{user}$ bps (e.g., 800 Kbps) and the server generally uses $L_{TCP}$ bits (e.g., 64 KBytes) as the TCP window size. The equivalent round-trip time for the user is $L_{TCP}/W_{user}$. Further, assume a maximal tolerable user throughput drop after coalescing, $F_{drop}$% (e.g., 1%), of the original throughput. The maximal coalescing time, Tc_max, can be determined as follows:

$$\{W_{user}-L_{TCP}/(L_{TCP}/W_{user}+Tc\_max)\}/W_{user}=F_{drop}\%$$

A system can automatically select a coalescing timeout value between (or equal to one of) Tc_min and Tc_max. Alternately, this value may be selected based on a user's preference. The approach described above is merely an example. Additionally, while the above described a throughput metric a wide variety of other constraining metrics may be used to limit the potential values of the coalescing timer 404.

Instead of a static coalescing timer value, DMA coalescing may dynamically respond to system conditions such as resource usage and/or network traffic volume. For example, as shown in FIG. 5, DMA coalescing may be dynamically enabled 504 or disabled 502 based on the volume of network traffic. For instance, if network traffic is very low, DMA coalescing will not significantly reduce the frequency of active DMA transfer periods. Alternately, if network traffic is too high, the opportunities to idle will be fewer, reducing the value of DMA coalescing with respect to the performance impact/latency caused by its operation. Thus, as shown in FIG. 5, a policy may disable 502 DMA coalescing if network traffic falls outside a range of beneficial DMA coalescing operation. DMA coalescing may resume 504 when network traffic again falls within the desired range. The range test may be over a configurable period of time. Additionally, the range test may need to be met for some number of consecutive (e.g., 3 consecutive 1 second periods) and/or non-consecutive periods (e.g., at least 4 out of 5) before enabling 504/disabling 502. The volume of traffic may be measured, for example, by a count of Rx and/or Tx packets over a period of time.

The DMA coalescing period can be also be dynamically adjusted by adaptive timer 410. For example, as shown in FIG. 6, the adaptive timer 410 may repeatedly attempt to increase 606 the DMA coalescing interval until 604 an increase significantly degrades platform throughput or fails to significantly increase overall performance. For instance, in the sample shown, the DMA coalescing value is initialized (e.g., to tc_min). Thereafter, a rate check 604 is performed that compares the Tx packet count ($Tx_{current-timer-value}$) for some duration (e.g., 1 second) under the current DMA coalescing duration against a Tx packet count ($Tx_{higher-timer-value}$) for the same duration under a higher DMA coalescing duration. If increasing the coalescing duration would degrade performance beyond some threshold, the adaptive timer 410 may leave 608 the coalescing duration at its current value. For example, if $$(Tx_{higher-timer-value}/Tx_{current-timer-value}) < F_{drop}\%$$

then the rate check 604 may fail 608. The adaptive timer 410 may require the rate check 604 to fail multiple times (e.g., 3) before abandoning 608 the attempt to increase the coalescing duration. The adaptive timer 410 may repeat the process above periodically. That is, the coalescing duration may be reset and attempts to increase it repeated after some period of time. Potentially, the reset value for the coalescing timer may change over time, for example, based on performance (e.g., an average of the previous initial value and the current value).

The process shown in FIG. 6 may operate on a pre-established stepping-stone set of coalescing durations spanning tc_min and Tc_max. Alternately, the next coalescing duration to try may also be dynamically determined.

FIG. 6 is merely an illustration of a sample process for dynamically altering the coalescing duration. A wide variety of other ways of dynamically determining the coalescing duration may be used. For example, an Rx packet count may be used instead of or in addition to a Tx packet count. Additionally or alternately, other techniques for adapting the coalescing duration may be based on measurements of different metrics that yield a coalescing duration value.

Other logic blocks may also affect DMA coalescing. For example, a DMA coalescing period may be aborted based on packets that are very delay sensitive 414. For example, the delay sensitive trigger 414 may receive identification of packets matching packet filter rules. The filter(s) may examine packet contents such a header fields (e.g., source IP address, IP port, destination IP address, IP port, protocol type, control bits, size, Ethernet type, TCP (Transmission Control Protocol) flags, VLAN (Virtual Local Area Network) priority, and so forth) to identify packets having predefined characteristics. After the packet filter(s) detect a packet match, coalescing can be stopped and restarted after a DMA transfer of queued data. Again, this can reduce the impact of DMA coalescing on time sensitive communication. For example, packets having a high QoS (Quality of Service), connection management packets, and/or TCP segments flagged as URGent can be sent to the a host protocol stack without delay of DMA coalescing.

The coalescing logic can also respond to other conditions. For example, logic 412 can monitor the amount of data (e.g., packets) DMA-ed over time. For example, if, over several consecutive DMA coalescing periods, only a single packet is DMA-ed in each period, DMA coalescing can be disabled for some duration. This and the detection of other special conditions can be performed by logic 412.

Coalescing described above can potentially create larger periods of time at a platform where DMA activity is absent. However, DMA activity is not the sole source of interruptions to idle periods on a platform. For example, in some implementations, a NIC may generate a processor interrupt after DMA transfer for every packet received. In response to the interrupt, a host processor can initiate packet processing for the received packet. Frequent interrupts, however, impose substantial processing overhead, for example, as processing contexts are swapped out to handle packet processing operations. To reduce this overhead, many devices implement a technique known as interrupt moderation. That is, instead of signaling a processor interrupt for each packet received and placed in host memory, interrupt moderation can enable a queue of packets to build and signal a single interrupt for multiple packets. This reduction in the number of interrupts alleviates some of the burden of processing packets on a host.

Figure 7:
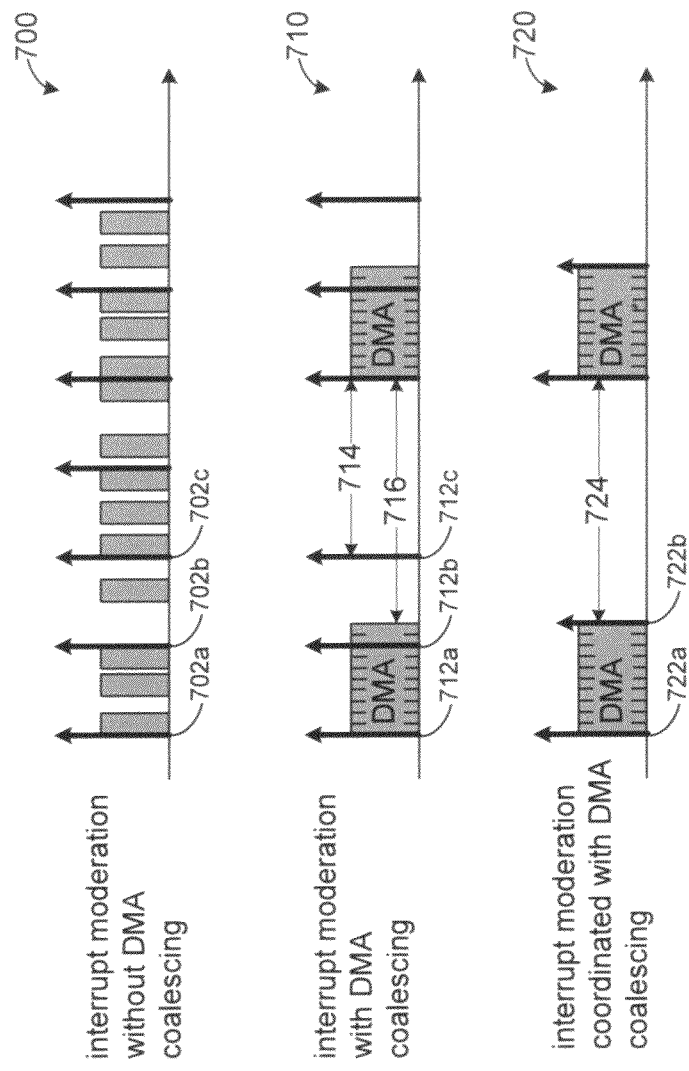
FIG. 7 is a diagram illustrating coordination of DMA coalescing with interrupt moderation.

Typically, interrupt moderation schemes operate at a given moderation interval. For example, FIG. 7 depicts a typical interrupt moderation scheme 700 implemented by a system that does not use DMA coalescing. As shown, a NIC can generate interrupts 702a, 702b, 702c at repeated intervals (e.g., 50 micro-seconds).

As illustrated in FIG. 7, implementing DMA coalescing on a NIC that also implements interrupt moderation 710 can further reduce the number of interrupts. For example, as shown, after a DMA coalescing period and an initial DMA transaction, the NIC generates an interrupt 712a to initiate receive processing of packets identified in the NIC receive queue(s). In accordance with a traditional interrupt moderation scheme, a second interrupt 712b is generated after the interrupt moderation interval to initiate receive processing of additional packets DMA-ed during the interval between interrupts 712a and 712b. Finally, a third interrupt 712c is generated after the interrupt moderation interval to process packets DMA-ed between intervals 712b and 712c In the absence of DMA transactions during the DMA coalescing period, no interrupt is generated until the next period of active DMA transfers.

Comparing 700 and 710 illustrates how DMA coalescing can reduce processor interrupts and create a significant idle period 714. However, as shown, an interrupt 712c occurs during an otherwise "quiet" DMA coalescing period causing the overall platform idle duration to shorten to 714 instead of an amount of time closer to the coalescing duration 716. Additionally, packet processing operations may further incur into time period 714. In other words, because the interrupts are not aligned with the period of DMA transfers, a portion of potential idle duration may be lost. However, better coordination of interrupt signaling with DMA coalescing can free much of the DMA coalescing period 716 from interrupt activity, increasing the platform idle duration for longer and deeper platform idle state residency.

As shown in FIG. 7, aligning 720 interrupt signaling with DMA coalescing can potentially increase the platform idle duration 724 and reduce the number of interrupts generated and their associated processor overhead. In the example shown, after a DMA coalescing period and a first DMA transaction is issued, a first interrupt 722a is signaled. In response, the host protocol stack begins processing of the coalesced packets. Thereafter, another interrupt 722b may be generated aligned with the end of the active period of DMA transfers, as opposed to at a later time (e.g., interrupt 712c). Again, comparing 720 with 710B illustrates an increase in the potential platform idle duration (e.g., from 714 to 724) and a reduction in interrupts (e.g., from three to one or two).

Again, many variations and alternate implementations are possible. For example, while many NICs feature a single Rx FIFO, some NICs may feature multiple Rx FIFOs such as NICs implementing Receive Side Scaling (RSS). In such implementations, an interrupt may be signaled for each Rx FIFO or each Rx FIFO having data. After a new DMA coalescing period begins, an additional interrupt for each Rx FIFO can be issued that still has unprocessed packets.

Figure 8:
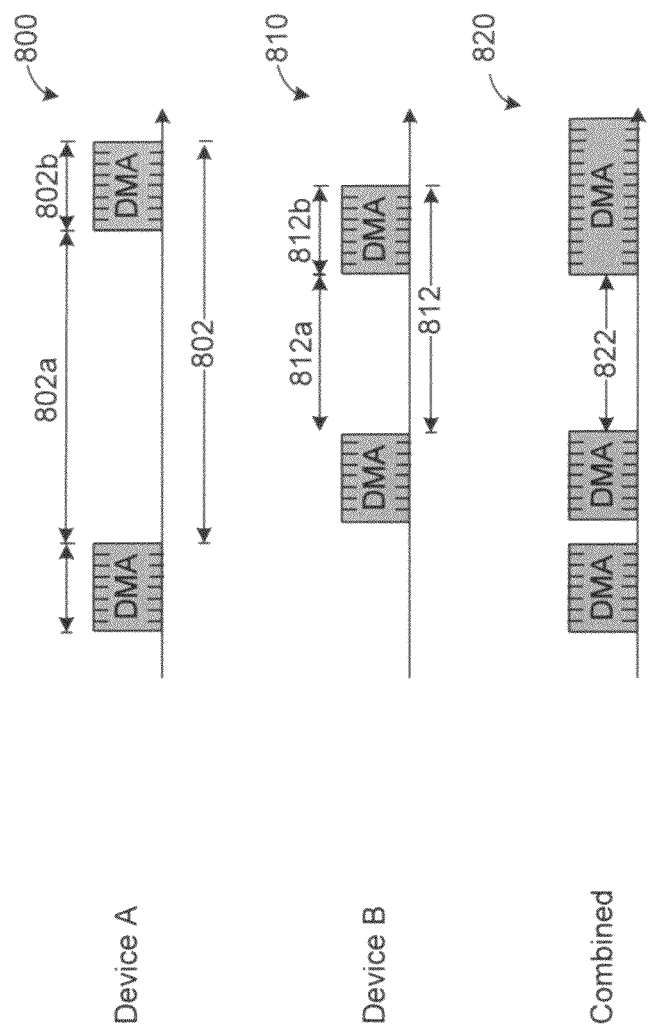
FIG. 8 is a diagram illustrating multiple devices implementing DMA coalescing.

As described above, DMA coalescing can concentrate DMA activity initiated by a device into a more compact period of time. However, potentially, multiple devices on the same host platform may perform DMA coalescing. For example, the host platform 100 in FIG. 1 may feature multiple NICs and/or other I/O devices. FIG. 8 illustrates sample operation of multiple devices 800, 810 performing DMA coalescing without coordination. As shown in this example, DMA transfers 802b of one device 800 occur during the DMA coalescing period of another 810, and vice versa. As shown, these interfering DMA coalescing schedules can chop platform idle durations into periods 822 potentially shorter than any given device's DMA coalescing duration, reducing potential power savings achieved by DMA coalescing.

Figure 9:
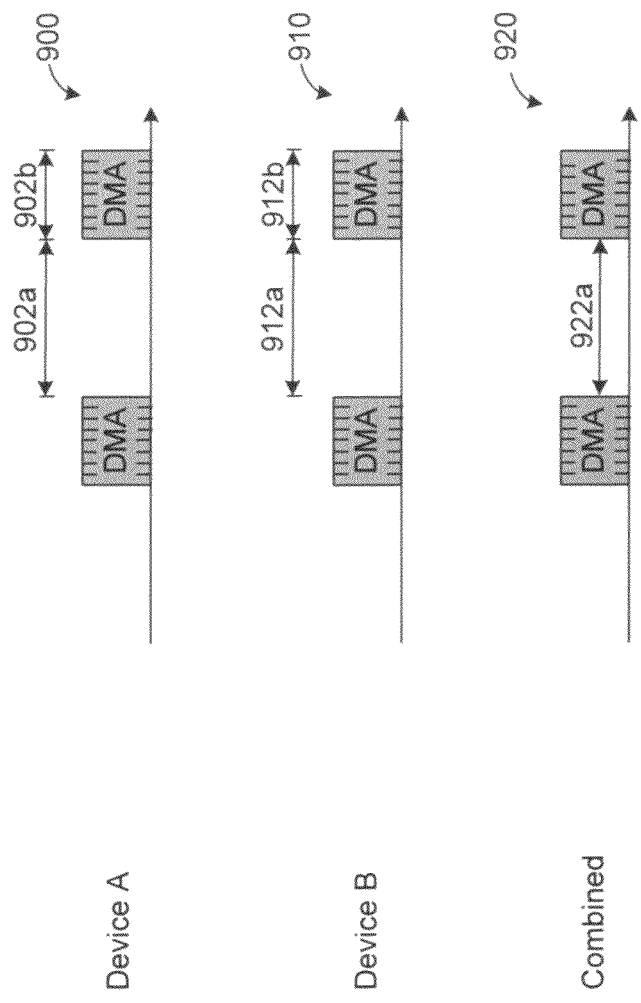
FIG. 9 is a diagram illustrating coordination of multiple devices implementing DMA coalescing.

As shown in FIG. 9, however, coordinating DMA coalescing across devices can create longer idle durations. For example, as shown, this coordination can synchronize the DMA coalescing of devices 900, 910 to consolidate the periods of active DMA transfers of these devices into a shorter, overlapping duration. As shown, the net result 920 leaves a longer platform idle duration 922a than achieved 822 in FIG. 8.

Figure 10:
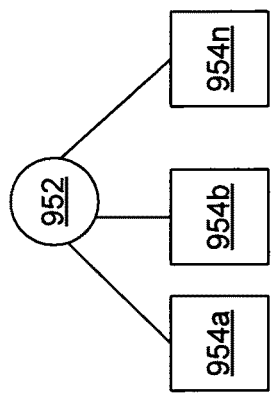
FIG. 10 is a diagram illustrating a coordinator of multiple devices implementing DMA coalescing.
Figure 11B:
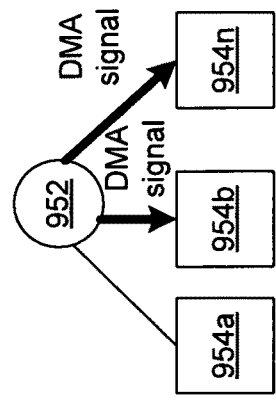
FIGS. 11A and 11B are diagrams illustrating coordination of multiple devices implementing DMA coalescing.
Figure 11A:
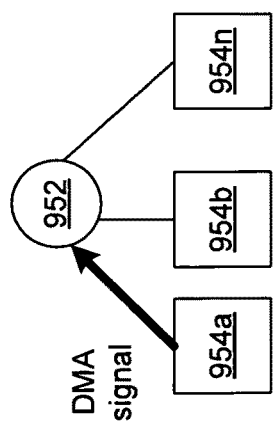

Alignment of DMA activity can be implemented in a wide variety of ways. For example, FIG. 10 illustrates a coordinator 952 that controls the DMA activity of different devices 954a-954n. In a sample implementation shown in FIGS. 11A and 11B, each device 954a-954n can maintain its own DMA coalescing policy and schedule, however, DMA activity by any of one device can trigger a DMA flush and reset of the DMA coalescing duration for other devices. For instance, as shown in FIG. 11A, the coordinator 952 receives notification from device 954a after the device's DMA coalescing duration ends (e.g., after the first DMA transfer by the device 954a). As shown in FIG. 11B, in response, the coordinator 952 can notify other devices (e.g., device 954b-954n) which, in turn, can end their DMA coalescing periods and flush any coalesced DMA activity to the host. Thereafter, the devices 954a-954n can resume their own DMA coalescing schemes.

In the implementation shown, the devices' maintain their own DMA coalescing policies but respond to the coordinator's 952 signal by stopping the current coalescing duration and starting a new one. Other implementations, however, may operate differently. For example, the coordinator can signal each device 954a-954n to start and/or end a DMA coalescing period, for example, after a predefined period of time (e.g., every 10 ms) much like a heartbeat signal. Alternately, the coordinator 952 can instead determine and provide a DMA schedule for one or more devices 954a-954n to follow. Such a schedule may be determined based on priority of I/O handled by the device, throughput, latency tolerance, device FIFO capacity, and other factors. Potentially, the resulting schedule may be uniform for each device, though they may differ. The schedules and/or heartbeats derived by the coordinater 952 may dynamically adapt to the DMA idle performance achieved by the platform and/or based on varying DMA activity volume of the devices.

The coordinator 952 may be implemented in a variety of hardware and/or software. For example, the coordinator 952 may be implemented as a software device driver. For instance, in Linux, a single NIC driver instance controls multiple Ethernet NICs and can be modified to implement coordinator 952 operations. For example, a received interrupt from one NIC can trigger a DMA alignment message to the other NICs. A software approach, such as that described above, would not require hardware changes to the devices or standardization. Alternately, the coordinator 952 may be implemented as an application and/or as a part of an operating system. Further, the coordinator 952 can be implemented as dedicated or programmable hardware, for example, in a chipset or I/O hub coupling the devices to the platform. Communication between the coordinator 952 and the devices 954a-954n can occur, for example, via configuration registers exposed by the devices 954a-954n and/or or via a software API (Application Programming Interface) such as a network driver interface specification.

While the above frequently described DMA coalescing performed by a NIC, DMA coalescing can be applied to other hardware subsystems/devices. Examples of such hardware subsystems include disk drive controllers, graphics cards, sound cards, and so forth. Additionally, while the above described DMA transfer of packets such packets may not be transferred as a monolithic structure. For example, packet headers and payloads may be split and transferred into non-contiguous locations in host memory.

The term circuitry as used herein includes hardwired circuitry, digital circuitry, analog circuitry, programmable circuitry, and so forth. The programmable circuitry may operate on computer programs disposed on a computer readable storage medium that implement techniques described above. The term packet as used herein encompasses frames (e.g., Ethernet frames), segments (e.g., TCP segments), Internet Protocol datagrams (e.g., IPv4 and IPv6) and other protocol data units (PDUs) used in networks.

Other embodiments are within the scope of the following claims.

What is claimed is:

1. A method comprising, at a device having at least one Direct Memory Access (DMA) engine:
   determining a repeated, periodic DMA coalescing interval based, at least in part, on a time period of a power sleep state of a host platform that is calculated to permit at least a sufficient amount of power consumption savings to result;
   buffering data received at the device in a FIFO (First-In-First-Out) queue during the repeated, periodic DMA coalescing interval; and
   DMA-ing the data enqueued in the FIFO to a memory external to the device after expiration of the repeated, periodic DMA coalescing interval.

2. The method of claim 1, wherein the device comprises a network interface controller comprising at least one PHY and at least one MAC (media access controller).

3. The method of claim 1, further comprising:
   disabling DMA coalescing based on a first determined rate of data; and
   resuming DMA coalescing based on a second determined rate of data.

4. The method of claim 1, further comprising:
   detecting at least one characteristic of a packet received by the device based on at least one packet header field; and
   based on the detecting the at least one characteristic, DMA-ing at least the packet prior to expiration of the repeated, periodic DMA coalescing interval.

5. The method of claim 1, further comprising:
   determining timing of at least one interrupt generated by the device based on the repeated, periodic DMA coalescing interval.

6. The method of claim 5, wherein the timing of the at least one interrupt comprises a first interrupt based on an end of a first DMA coalescing interval.

7. The method of claim 1, further comprising:
   receiving a signal from a host processor sent to multiple coupled devices; and
   in response, terminating the DMA coalescing interval prematurely.

8. The method of claim 1, wherein the determining comprises repeatedly dynamically adjusting the DMA coalescing interval during continuing operation.

9. The method of claim 1, further comprising:
   comparing buffer occupancy with a threshold; and
   based on the comparing, terminating DMA coalescing prior to the expiration of the repeated, periodic DMA coalescing interval.

10. A network interface controller comprising:
at least one PHY;
at least one MAC (media access controller) communicatively coupled to the at least one PHY;
at least at least one Direct Memory Access (DMA) engine to transfer packets received via the at least on PHY and at least one MAC to a host memory;
logic to:
determine a repeated, periodic DMA coalescing interval based, at least in part, on a time period of a power sleep state of a host platform that is calculated to permit at least a sufficient amount of power consumption savings to result;
buffer data received at the device in a FIFO (First-In-First-Out) queue during the repeated, periodic DMA coalescing interval; and
DMA the data enqueued in the FIFO to a memory external to the device after expiration of the repeated, periodic DMA coalescing interval.

11. The network interface controller of claim 10, further comprising logic to:
disable DMA coalescing based on a first determined rate of data; and
resume DMA coalescing based on a second determined rate of data.

12. The network interface controller of claim 10, further comprising logic to:
detect at least one characteristic of a packet received by the device based on at least one packet header field; and
based on the detecting the at least one characteristic, DMA at least the packet prior to expiration of the repeated, periodic DMA coalescing interval.

13. The network interface controller of claim 10, further comprising logic to:
determine timing of at least one interrupt generated by the device based on the repeated, periodic DMA coalescing interval.

14. The network interface controller of claim 13, wherein the timing of the at least one interrupt comprises a first interrupt based on an end of a first DMA coalescing interval.

15. The network interface controller of claim 10, further comprising logic to:
receive a signal sent to multiple coupled devices; and
in response, terminating the DMA coalescing interval prematurely.

16. The network interface controller of claim 15, wherein the logic to determine comprises logic to repeatedly, dynamically adjust the DMA coalescing interval during continuing operation.

17. The network interface controller of claim 10, further comprising logic to:
compare buffer occupancy with a threshold; and
based on the comparing, terminate DMA coalescing prior to the expiration of the repeated, periodic DMA coalescing interval.

* * * * *